March 20, 1956     W. BEJEUHR     2,738,680
INDICATING STATIC BALANCER
Filed Oct. 18, 1951     4 Sheets-Sheet 1
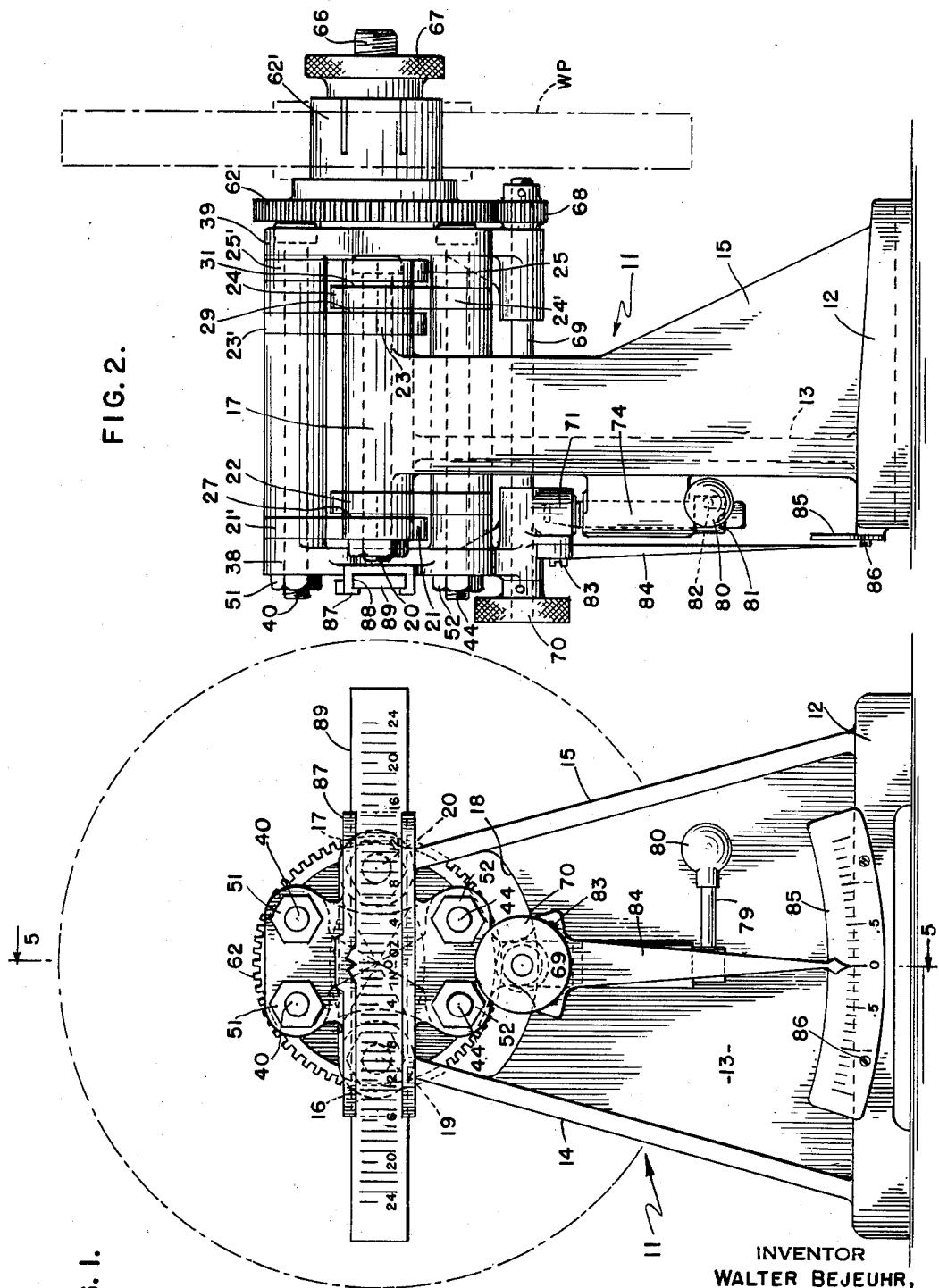
INVENTOR
WALTER BEJEUHR,
BY
*Irving Seidman*
ATTORNEY March 20, 1956  W. BEJEUHR  2,738,680
INDICATING STATIC BALANCER Filed Oct. 18, 1951  4 Sheets-Sheet 2

INVENTOR
WALTER BEJEUHR,
BY
*Irving Seidman*
ATTORNEY

March 20, 1956     W. BEJEUHR     2,738,680
INDICATING STATIC BALANCER
Filed Oct. 18, 1951     4 Sheets-Sheet 3
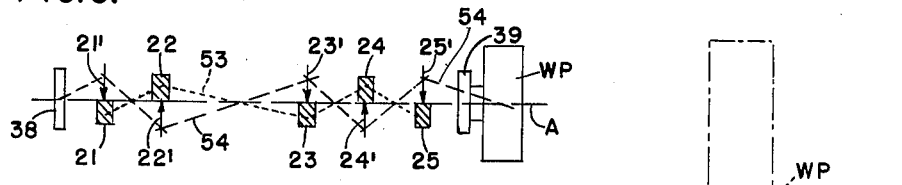
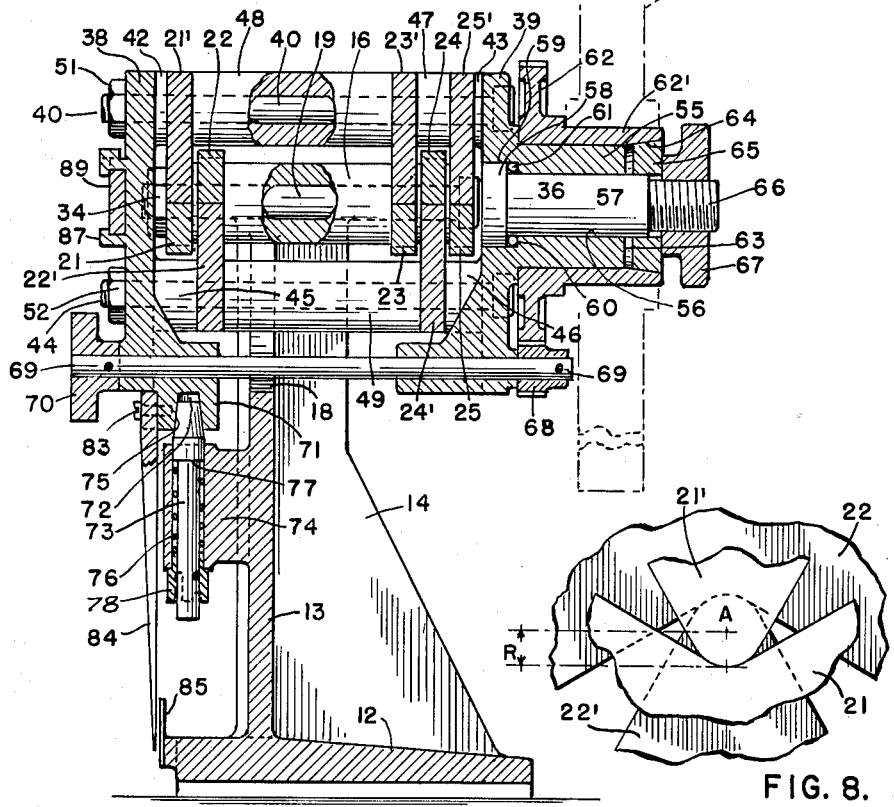
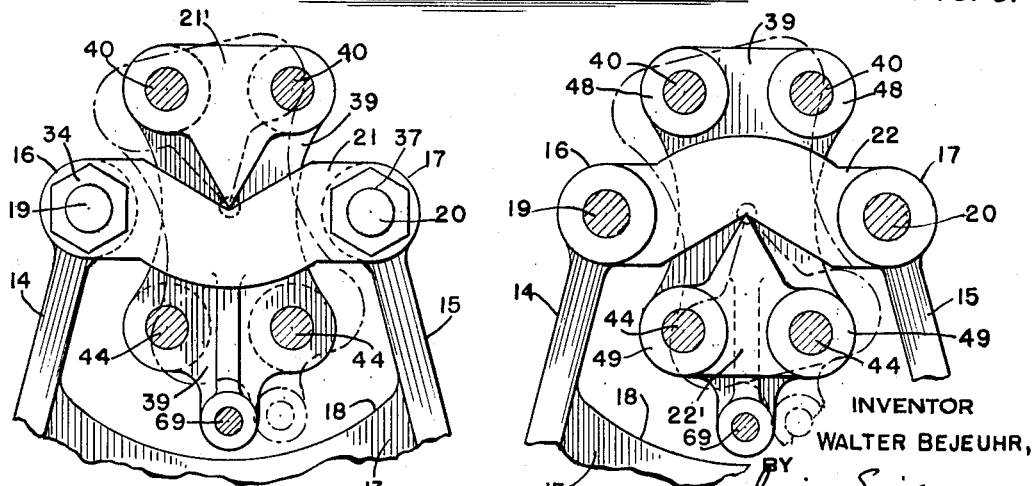
INVENTOR
WALTER BEJEUHR,
BY Irving Seidman
ATTORNEY March 20, 1956   W. BEJEUHR   2,738,680
INDICATING STATIC BALANCER
Filed Oct. 18, 1951   4 Sheets-Sheet 4

INVENTOR
WALTER BEJEUHR,
BY
Irving Seidman
ATTORNEY

> United States Patent Office 2,738,680
Patented Mar. 20, 1956

2,738,680

INDICATING STATIC BALANCER

Walter Bejeuhr, Suffern, N. Y.

Application October 18, 1951, Serial No. 251,936

4 Claims. (Cl. 73—480)

This invention relates to a balance testing machine and has particular reference to a static balancing apparatus in which an oscillating unit carrying a work piece to be tested for its off balance condition, comprises a series of oscillating rockers and stationary, coacting cradles; the said cradles being interconnected and immovably supported upon a single standard or supporting member while the oscillating rockers are interconnected to form a single oscillating unit and engage, in alternate relation, above and below the cradles in a manner which will assure perfect axial alignment of all the oscillating rockers and cradles with a work piece carried upon a supporting means formed upon and projecting from the oscillating rocker unit.

Balancing machines, at present in use, all have a pair of upright supporting members between which the work piece or article to be tested for an off-balance condition is supported between a pair of standards and between which supports the work piece is rotated to test and determine the off-balance condition of same.

An object of this invention is the provision of a balance testing machine comprising a single supporting leg or standard upon which a carrier means projects from one side of the machine and supports a work piece for testing purposes, thereby eliminating the necessity for dual supporting members.

Another object of this invention is to provide a balancing machine in which intermittent knife edge bearings are so arranged and mounted that their bearing edges engage and coact alternately, in downwardly and upwardly directions, with supporting cradles thereby confining the assembly of the rockers to a limited movement about a center line or axis.

A further object of this invention is in the provision of a balancing machine in which it is possible to use a low friction bearing enabling a very fine degree of detection of an off balance condition in a work piece.

Still another object of this invention is in the provision of a balancing machine in which the position and amount of off-balance of a work piece being tested is indicated.

A further object of this invention is the inclusion therein of a locking means upon the stationary supporting leg and engageable with the rocking unit to immobilize same.

A further object of this invention is the means employed therein to prevent the rocker unit and extending work carrying means from tilting.

The apparatus comprises a single leg or supporting standard upon which there is carried a plurality of stationary supporting recessed cradles which are spaced apart and so arranged that the seat of each alternating recessed cradle faces upwardly and downwardly. A plurality of interconnected scale type or knife-edged rockers engage in the seats of the recessed cradles, alternately in a downward and upward direction. The interconnected knife-edged rockers form a single unit which is adapted to oscillate upon the recessed cradle seats which are all in axial alignment. Forming a part of the oscillating rocker unit and extending outwardly therefrom, there is an attachment means for mounting and securing a work piece which will oscillate with the rocker unit when being tested for an off-balance condition.

An arcuate scale having graduations thereon is attached to one face of the supporting standard and, coacting with a pointer axially mounted upon the oscillating rocker unit, determines the off-balance of a work piece being tested. A means is provided for locking the rocker assembly in a neutral position radially and into the proper clearance between segments to avoid endwise friction.

A still further object of this invention is the provision of an organization in which the constituent elements are so arranged structurally and functionally as to assure improved results with materials and members which may be manufactured at reasonable cost, may be easily assembled and which will be efficient in operation with minimum wear to the parts.

The best embodiment of the invention has been chosen for illustrative purposes, but this embodiment should be viewed as being illustrative only and not as limiting because obviously the invention is capable of other embodiments having revised details of construction, so long as they fall within the ambit of the appended claims.

The invention itself, however, both as to its organization and its method of operation, will best be understood from the following description of a specific embodiment when read in connection with the accompanying drawing, in which:

Fig. 1 is an end elevation of one embodiment of this invention.

Fig. 2 is a side elevation of same.

Fig. 5 is a sectional elevation taken along the plane indicated by line 5—5 in Figs. 1 and 3.

Fig. 6 is an enlarged diagrammatic, fragmentary detail showing a part which will be hereinafter described.

Fig. 7 is a similarly enlarged view of another part which will also be hereinafter explained.

Fig. 8 is a fragmentary, diagrammatic view, microscopically enlarged, of a part which will hereinafter be described and Fig. 9 is a diagram showing the relative position and movement of an essential part of the invention and will be hereinafter fully explained.

Figure 3:
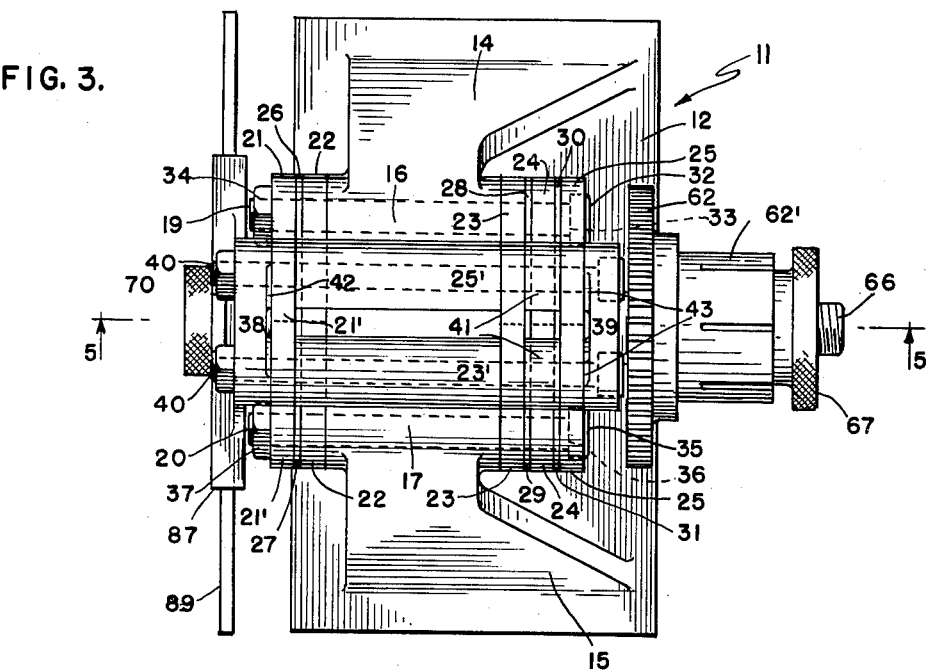
Fig. 3 is a top or plan view of same.
Figure 4:
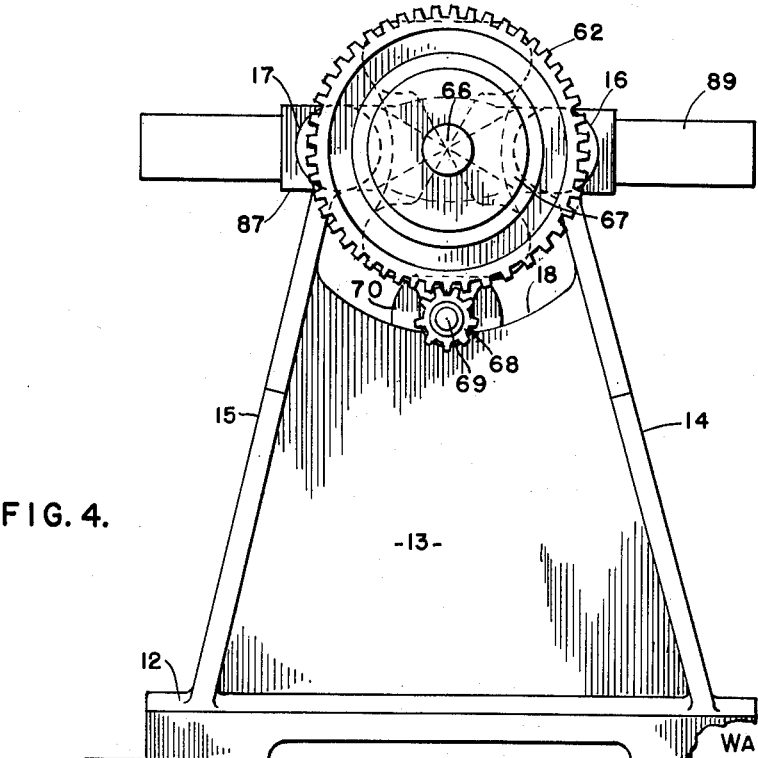
Fig. 4 is an elevational view of the end opposite to end view of Fig. 1.

Referring in detail to the parts and in which like numerals indicate like parts, 11 designates, generally, a standard or upright supporting member comprising a base 12, a web or cross wall 13, broad at its base and narrowed at its top, having broad side flanges 14 and 15 terminating at their tops in cylindrical extensions or hubs, 16 and 17, which form mountings for parts to be described. The web 13 has a cut out portion 18 to give free movement to parts which oscillate therein and which will be fully described as this description continues.

Extending through the hubs or cylinders 16 and 17 are bolts 19 and 20 respectively which hold upon the hubs 16 and 17, cradles 21, 22, 23, 24 and 25 (see Figs. 2, 3, 5, 6 and 7). Between the cradles 21 and 22, around the bolt 19, is a spacer 26 and at the bolt 20 there is a spacer 27 (Fig. 3). The hubs 16 and 17 form spacers between the cradles 22 and 23; between the cradles 23, 24 and 25 on bolt 19 are spacers 28 and 30 respectively; between the same cradles 23, 24 and 25 on bolt 20 there are spacers 29 and 31 respectively. The bolt 19 has a head 32 which is countersunk into the cradle 25 at 33 and is threaded at its opposite end to which a tightening nut 34 is attached. Similarly the bolt 20 is headed as at 35, countersunk into the cradle 25 as at 36 and has a tightening nut 37 upon its opposite end, all best shown in Fig. 3. The parts so far described, when securely fastened together constitute, with the exception of a locking member to be later described, all of the stationary parts of the machine.

Figure 10:
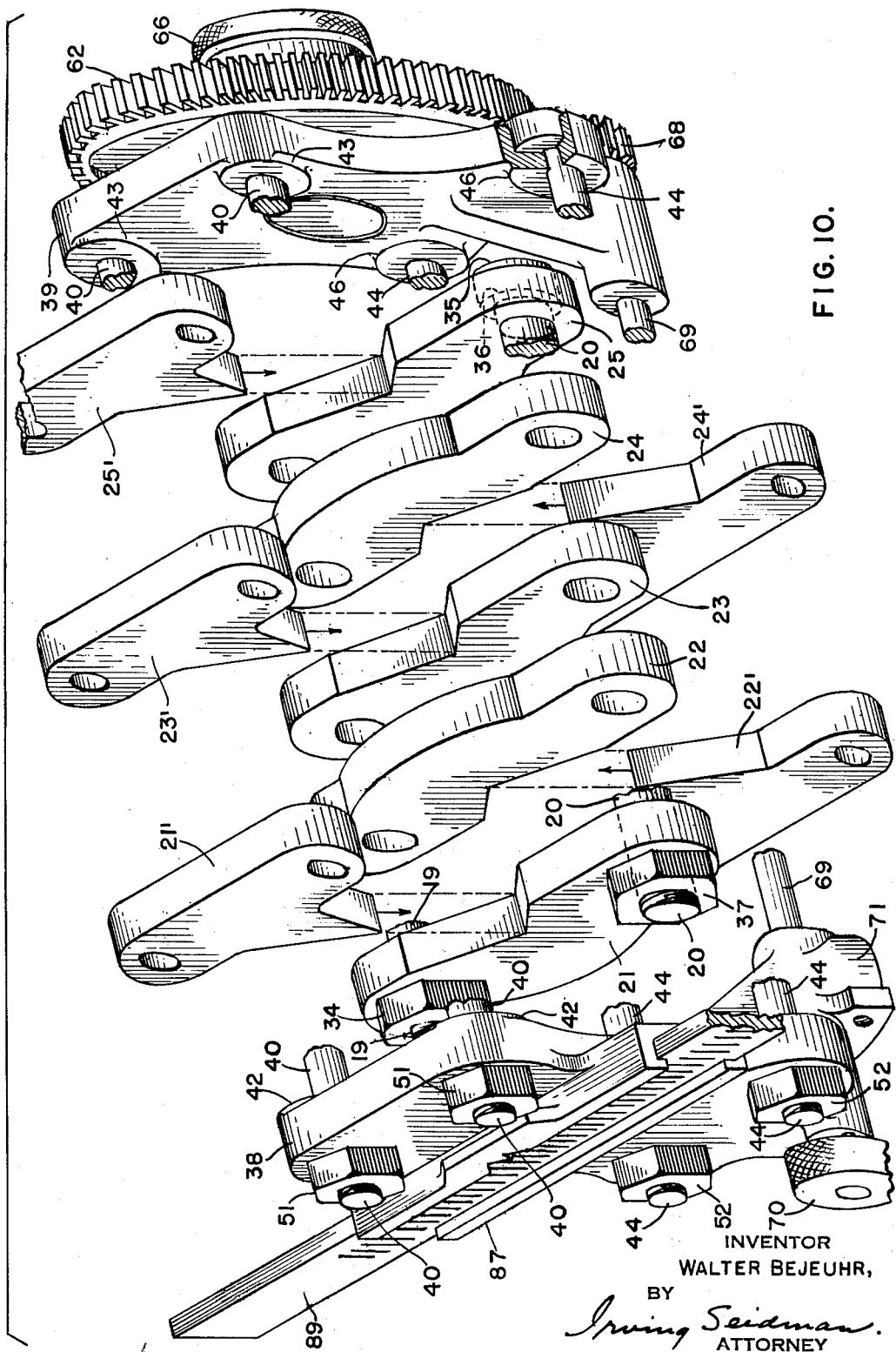
Fig. 10 is an enlarged, exploded view of an oscillating rocker movement which will also be hereinafter fully described and explained. (The view shows portions broken away.)

A rocker unit, comprising knife edged rockers 21', 22', 23', 24' and 25', engageable with the cradles 21, 22, 23, 24 and 25, respectively, and secured to and between the end plates 38 and 39, is adapted to oscillate about the knife edged rockers 21', 23' and 25' in engagement with the cradles 21, 23 and 25, and is held in axial alignment by the engagement of the knife edged rockers 22' and 24' with their coacting cradles 22 and 24. Upper rods or elongated bolts 40 engage through the end plates 38 and 39 and through the rockers 21', 23' and 25' and have spacers 41 (Fig. 3) which lie between the rockers 23' and 25'. Bosses 42 upon end plate 38 and bosses 43 upon end plate 39 act as spacers between the end plate 38 and rocker 21' and between end plate 39 and rocker 25' respectively. Similar long bolts 44 engage through and between the lower portion of the end plates 38 and 39 and through the rockers 22' and 24'. Bosses 45 upon the end plate 38 form spacers between the end plate 38 and the rocker 22' and bosses 46 upon the end plate 39 form spacers between the rocker 24' and the end plate 39. Between the rockers 23' and 25' upon the bolt 40, there is a spacer 47 and upon the same bolt 40 a spacer 48 lies between the rockers 21' and 23'. Upon bolt 44, between the rockers 22' and 24' there is a spacer 49 (Fig. 5). The bolts 40 and 44 have their heads countersunk into the end plate 39 (Fig. 10) and are provided with tightening nuts 51 and 52 respectively which engage against the end plate 38.

In Fig. 6 there is shown an enlarged detail view of the rocker 21' with its knife edge resting in the cradle 21 and exerting a downward pressure upon same. In Fig. 7, there is shown, drawn to the same scale as Fig. 6, the rocker 22' engaging the cradle 22 but exerting an upward pressure against same. In a similar manner the rockers 23' and 25' engage with, and exert a downward pressure upon the cradles 23 and 25 respectively and the rocker 24' engages with and exerts an upward pressure upon the cradle 24. From the description of the rockers and their contacting cradles the unit forms two sections. One section comprising the cadles 21, 23 and 25 and the inverted cradles 22 and 24, all of which are mounted upon a single standard or supporting member and are stationary thereon, while the second section consists of an oscillating unit which comprises the rockers 21', 23' and 25' which engage downwardly upon the stationary cradles 21, 23 and 25 and the rockers 22' and 24' which engage upwardly against the cradles 22 and 24. The rockers as already noted are tied together with the end plates and form a single oscillating unit.

The diagram of Fig. 9 shows this relative position of the end plates, a work piece, the rockers and the cradles. The cross sectioned parts represent the cradles 21, 22, 23, 24 and 25, the arrows the rockers 21', 22', 23', 24' and 25'. The end plates are indicated by the boxes 38 and 39 and a work piece, which is mounted upon the plate 39, by the box WP. The broken, dotted line 53 indicates the tieing together of the stationary cradles and the broken dash line 54 indicates the tied together rockers, end plates and work piece which oscillate as a single unit. In the highly enlarged view of Fig. 8, the so called knife edge of the rocker and its seat in its cradle are shown formed as parts of an arc of a circle whose radius R is approximately .001", thus eliminating any undue wear and so mounted that the axis point A is represented by the line A in Fig. 9 and is in alignment with the knife edges of all the rockers and with the axis of the work piece when mounted upon the machine. This arrangement eliminates any tilting movement caused by the weight of the work piece mounted as shown. In the various views where shown, the work piece is indicated by dot-dash lines. The dot-dash lines in Figs. 6 and 7 indicated a tilted position of the rockers with respect to the stationary cradles.

Referring now to Fig. 5, it will be observed that a shank 55 extends outwardly from and is integrally formed with the end plate 39 and has a central bore 56 through which a short shaft 57 extends. This shaft has a head 58 which engages in a widened end portion 59 of the bore 56. An annular pocket between the shoulder formed by the head and the inner end of the widened bore 58 provides a raceway for anti-friction ball bearings 61 thereby providing a bearing for the shaft 57 to rotate within the bore 56.

A gear 62 formed with an annular, slotted flange 62' (Figs. 2 and 5), is rotatably mounted upon the shank 55. The said annular, slotted flange 62' extends slightly beyond the end 63 of the shank 55, the inner circumference of the projecting portion being slightly beveled, as at 64 for receiving a jam block 65, the outer periphery of which conforms to and engages the beveled portion 64 of the annular flange 62'.

The outer end of the shaft is diametrically contracted and is threaded as at 66 to receive a hand operated nut 67. By turning the nut 67 down upon the threaded portion 66 of the shaft 57 the block 65 is pressed in against the beveled portion 64 of the slotted annular flange 62' thus forcing the wall of the slotted, annular flange 62' outwardly to tightly secure a work piece WP thereon, as shown by dot-dash line in Fig. 2. The gear 62 is rotated by means of a pinion 68, keyed upon the end of a shaft 69 which extends through and has bearings in the end plates 38 and 39. A hand wheel 70 is keyed upon the opposite end of the shaft 69 and provides a means for manually turning the pinion 68.

Upon the end plate 38 there is formed a projecting arm 71 which has a tapered recess 72. The said recess 72 engages a locking pin 73 slidably mounted in a casing 74 formed upon the web 13. The said locking pin 73 is formed with a tapered head 75 which fits into the tapered recess 72 and is urged therein by a helical spring 76 disposed between a shoulder 77 at the base of the tapered head 75 and a bearing thimble 78 at the base of the lug 74. With the locking pin 73, in the position shown in Figs. 1, 2 and 5, the rocker unit is held against any oscillating movement. To release the locking pin 73 from the rocker unit there is provided a manually operable handhold comprising a short shaft 79 having a ball end 80 (Figs. 1 and 2). The shaft 79 is secured to and extends laterally from the lower end of the locking pin 73 and when forced downwardly against the urge of the spring 76, unlocks the rocker unit. The locking pin 73 may be held in the unlocking position by slightly turning same and allowing the shaft to rest in a shallow notch 81 (Fig. 2). When in locked position the shaft rests in the deeper notch 82, shown by dotted line in Fig. 2.

From a point just below the hand wheel (Figs. 1 and 2), and secured to the end plate 38, by means of screws 83, there is a pointer 84 extended downwardly and aligned with a graduated arcuate plate 85 which is secured to the base 12 by the screws 86. A rack or supporting frame 87 having grooves 88 is formed upon and extends from the end plate 38 and carries a graduated sliding bar 89 which is adapted to slide laterally in either direction when manually moved.

When about to use the testing machine, an operator first sets the locking pin 73 to immobilize the rocker unit. The work piece is then attached. If a wheel with a central bore as shown in several views, is to be tested, the slotted, annular flange 62' is employed to hold the wheel in position upon the machine.

For the next step, the operator unlocks the rocker unit, then turns the hand wheel 70 until the pointer 84 registers the maximum amount of off-balance. If the pointer 84 should reach the limit of its movement before the maximum off balance is indicated, the sliding bar 89 is moved to bring a counter-weight into play and moves the pointer 84 back to a free swinging position.

The balance testing machine above described, it will be noted, can be used as a single unit to support a work piece without being tilted out of axial alignment with contacting knife edged rockers in their cradles, due to the alternate downward and upward pressure of the rockers upon their cradle seats.

I claim:

1. A static balancing machine comprising a stationary support means and a rocker unit adapted to oscillate upon the said stationary support; the said stationary support consisting of a base, an upright supporting standard secured to said base, hubs secured to the upper portion of said standard, cradles having recessed edges secured upon the said hubs by means of bolts extending therethrough, the said recessed cradles being spaced apart upon the said bolts and arranged thereon so that their recessed edges alternately face upwardly and downwardly; the said oscillating rocker unit consisting of spaced apart end plates held in position by means of a pair of upper and a pair of lower bolts secured to the said end plates, knife-edged rockers secured upon the said upper and lower bolts, the said knife edges of the rockers secured to the upper bolts depending and having engagement with aligned recessed cradles upon the stationary unit and the knife-edges of the rockers secured to the lower bolts extending upwardly and having engagement with aligned recessed cradles upon the said stationary unit; the knife-edge rockers and the engaging recessed cradles being in axial alignment at their points of contact and the said rocker unit being adapted to oscillate about the points of contact of the said rockers with the said cradles, a work-piece holding member formed upon and extending outwardly from one end plate and consisting of a bored shank formed upon said end piece, coaxially with said points of contact, a shaft threaded upon its outer end, extending through said shank, an annular flange having a split wall, engageable over the said shank and projecting beyond same and having the inner wall of the projecting portion of said annular flange beveled, a beveled jam-block engageable with the said beveled portion of the annular flange, and a thumb nut engageable over the threaded portion of said shaft and adapted to screw against the said jam-block to force same inwardly and expand the wall of the said annular flange and tighten same against the wall of a bore in the work-piece to be held upon the annular flange.

2. A static balancing machine as set forth in claim 1 including means for rotating the said work-piece, said means comprising a gear rotatable upon said shank and formed integrally with said annular flange having a split wall, a rotatable shaft mounted in and extending through said end plates, a pinion affixed to one end of said shaft and in engagement with said gear, and a knob upon the other end of said shaft to rotate said pinion and gear.

3. A static balancing machine as set forth in claim 1 including means for locking the said rocker unit against oscillation, said means comprising a spring actuated pin slidably mounted upon said stationary member and engageable in a recess in the said oscillating rocker unit.

4. A static balancing machine as set forth in claim 1 including a bar laterally slidable in grooves formed upon an end plate and adapted to function as a counter-weight to counterbalance the oscillating rocker unit when an excessive off-balance is indicated.

References Cited in the file of this patent

UNITED STATES PATENTS

| | | |
|---|---|---|
| 1,599,609 | Damerell | Sept. 14, 1926 |
| 2,375,171 | Torrey | May 1, 1945 |

FOREIGN PATENTS

| | | |
|---|---|---|
| 133,865 | Great Britain | Oct. 23, 1919 |
| 157,962 | Great Britain | Apr. 10, 1922 |
| 182,465 | Great Britain | June 14, 1923 |